W. H. PRATT.
ELECTRIC CURRENT SHUNT.
APPLICATION FILED FEB. 3, 1913.
1,114,515.
Patented Oct. 20, 1914.
Fig. 1.
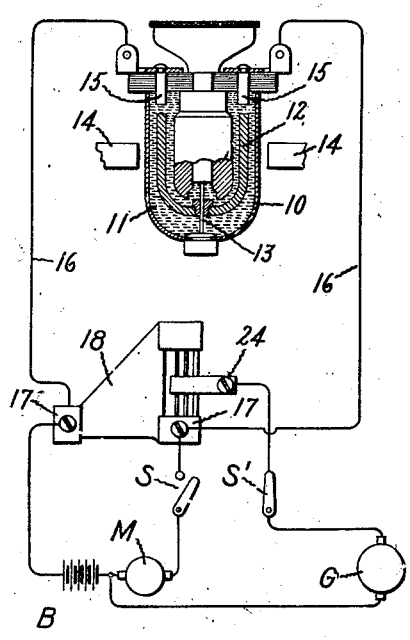
Fig. 2.
Fig. 3.
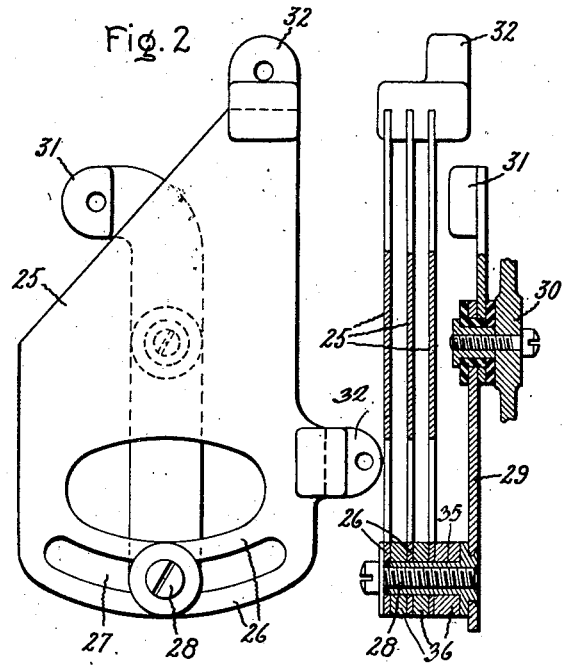
Fig. 4.
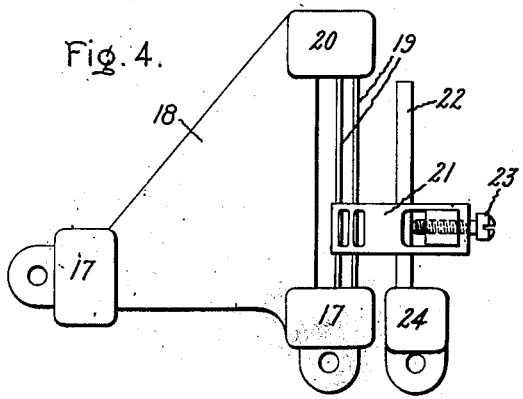
Fig. 5.
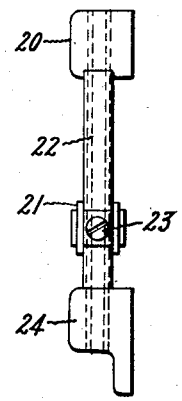
Witnesses
Chas B Strkes
J. Ellis Glen
Inventor:
William H. Pratt,
by
His Attorney.

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

ELECTRIC-CURRENT SHUNT.

1,114,515.   Specification of Letters Patent.   Patented Oct. 20, 1914.

Application filed February 3, 1913. Serial No. 746,004.

*To all whom it may concern:*

Be it known that I, WILLIAM H. PRATT, a citizen of the United States, residing at Lynn, county of Essex, State of Massachusetts, have invented certain new and useful Improvements in Electric - Current Shunts, of which the following is a specification.

My invention relates to electric current shunts, and more particularly to current shunts for use in connection with electrical measuring instruments.

My invention is particularly adapted for use with instruments employed in indicating or recording the charge and discharge conditions of storage batteries, and I have accordingly chosen in the following specification this application of my invention for the purposes of illustration.

The objects of my invention are to provide a novel and improved construction of electric current shunt, and more specifically a current shunt particularly adapted for use with a battery charging and discharging instrument.

Further objects of my invention are to provide a current shunt for the above-mentioned purpose which may be readily and accurately adjusted to compensate for the difference in energy supplied to a storage battery during charge and taken from the battery during discharge.

The novel features which I believe to be characteristic of my invention will be indicated in the claims appended hereto.

The features of construction and mode of operation will be understood from the following description taken in connection with the accompanying drawings which show preferred embodiments of my invention, and in which:—

Figure 1 is a diagrammatic representation of the novel features of my invention in its application to a battery charging and discharging instrument; Fig. 2 is an elevation of a preferred form of my improved shunt; Fig. 3 is a sectional elevation of the shunt shown in Fig. 2; Fig. 4 is an elevation of a modified construction of shunt; and Fig. 5 is an end view of the shunt illustrated in Fig. 4.

The amount of energy supplied to a storage battery in charging is always in excess of that taken from the battery on discharge. In indicating or recording the charge and discharge conditions of a storage battery, it is customary to employ an instrument which is automatically compensated for the difference between the amount of energy put into the battery and the amount taken out. This compensation is generally provided by giving to the instrument a different rate of registration on discharging than its rate of registration on charging. The electric current shunt of my invention provides a ready and accurate means for this compensation of a battery charging and discharging instrument, as will be better understood by reference to Fig. 1 of the drawings.

In Fig. 1 of the drawings there is diagrammatically represented a storage battery B adapted to be connected to either a generator G or a motor M by means of switches S and S'. When the switch S' is closed and the switch S open, as indicated in the figure, the battery is connected to the generator and is being charged. On the other hand, when the switch S is closed and the switch S' open, the battery is connected to the motor M and is discharging.

For the purpose of illustration, I have employed a mercury motor ampere - hour meter. It will be understood, however, that my invention is in no sense limited to this particular type of instrument. The meter illustrated is similar in construction to that described in my prior Patent No. 993,872, dated May 30, 1911, and comprises a retaining chamber 10 containing a body of mercury 11. Within the chamber and submerged in the mercury is a cup-shaped armature 12 which is rigidly secured to the rotatable meter shaft 13. The mercury 11 and cup-shaped armature 12 are located within the field influence of a permanent magnet whose poles are indicated by reference characters 14. Current is conducted to the mercury within the retaining chamber by electrodes 15 electrically connected by conductors 16 to terminals 17 of my novel and improved electric current shunt.

The current shunt diagrammatically illustrated in Fig. 1 of the drawings is shown in greater detail in Figs. 4 and 5. By reference to these figures, it will be seen that the shunt comprises a substantially triangular sheet or member of resistance material 18 provided with two relatively fixed terminals 17. Auxiliary strips or members of resistance material 19 are electrically connected between one of the terminals 17 and the third corner 20 of the sheet of resistance material 18. An adjustable contact member 21 is arranged to slide in contact with the strips of resistance material 19 and is mounted on a guide bar 22. The contact member 21 may be operatively secured to the bar 22 at any desired position by means of a bolt 23. The resistance strips 19 are thus, through the medium of the contact member 21 and the bar 22 electrically connected to the third terminal 24 of the shunt.

Referring again more specifically to Fig. 1 of the drawings, it will be seen that the fixed terminals 17 are connected to the terminals of the instrument, the electric circuit of which is referred to hereinafter as the derived circuit. When the switch S is closed and the switch S' open the terminals 17 are also connected to the circuit including the battery B and motor M, which is referred to hereinafter for convenience as the supply circuit.

When the switch S is closed and the switch S' open the relative drop in potential between the terminals 17—17 will be constant. I have employed the expression relative potential drop to designate the drop in potential between the terminals 17—17 in its relation to the current in the derived circuit and the current in the supply circuit. By constant relative drop in potential I mean that the drop in potential between the terminals 17—17 is such that the ratio of the current in the derived circuit to that in the supply circuit is constant and incapable of adjustment.

The third and adjustable terminal 24 of the shunt is connected to the supply circuit which includes the generator G and battery B. It will thus be evident that the terminal 24 is employed only when the switch S' is closed and the switch S open, as indicated in Fig. 1 of the drawings. By adjusting the position of the contact member 21 on the strips of resistance material 19 the resistance of the shunt between the adjustable terminal 24 and the fixed terminals 17—17 may be varied and in this manner the proportion of the main supply current which is shunted to the derived or instrument circuit may be controlled. The adjustment of the contact member 21 thus serves to vary the relative potential drop between the terminals 17—17; that is, for a constant supply current the potential drop between the terminals 17—17 can be varied by adjusting the contact member 21. In other words the ratio of the current in the derived circuit to that in the supply circuit is capable of adjustment.

From a consideration of Fig. 1 it will be apparent that when the battery B is discharging through the motor M the relative potential drop across the shunt terminals 17—17 will be at its maximum, so that the meter will have its highest speed or rate of registration under this condition. When the battery is charging the current enters at the terminal 24 and distributes itself in two paths, a portion going toward the adjacent terminal 17 and a portion toward the corner 20. By regulating the position of the contact member 21, the relative drop in potential between the terminals 17—17, is adjustable. By this arrangement it is possible to make a correct compensation for the excess amount of current supplied to the battery in charging. This correction or compensation can be adjusted to allow for losses in the battery and also for any disturbance in the average meter speed due to the lighter load at which the charge will be registered in comparison to the discharge.

Figs. 2 and 3 illustrate another construction of shunt embodying the novel features of my invention. The main sheet or member of resistance material 25 of this construction of shunt is also of substantially triangular shape. Strips of resistance material 26 are integrally connected with the main member of resistance material 25 and are separated from one another by a sector-shaped guide slot 27. A contact bolt 28 is operatively mounted in the slot 27 and is carried by a pivoted arm 29. The arm 29 is pivoted to a fixed part 30 and is provided at its upper end with a terminal 31. It will thus be seen that the arm 29 can be turned about its pivot and the contact bolt 28 secured in any desired position in the guide slot 27. It will be understood that the bolt 28 and arm 29 serve to electrically connect the strips of resistance material 26 to the terminal 31. As illustrated in Fig. 3 of the drawings, I may employ a plurality of resistance members 25 and 26 which thus serve to increase the capacity of the shunt. In the drawings I have shown three resistance members connected in parallel. A sleeve 35 is secured to the arm 29 and carries three circular spacing washers 36 which serve to suitably space the resistance members from one another and from the arm 29. The bolt 28 is screw threaded in the sleeve 35 and serves to firmly bind the strips 26, the spacing washers 36 and arm 29 together in the desired adjusted position. The shunt illustrated in this figure is provided with fixed terminals 32 corresponding to the terminals 17 of the construction of shunt shown in Figs. 1, 4 and 5.

While I have shown certain forms of construction by which my invention may be carried out, I do not desire to limit myself to these particular forms of construction, but seek in the appended claims to cover all modifications thereof which will be obvious to those skilled in the art and which are within the scope of my invention.

What I claim as new and desire to secure by Letters Patent of the United States, is:—

1. An electric current shunt comprising a member of resistance material having two terminals for connection to a derived circuit, an auxiliary member of resistance material electrically connected to said first mentioned member, a third terminal operatively related to said auxiliary member and arranged for connection to a supply circuit, and means whereby the position of the third terminal on the auxiliary member may be adjusted.

2. An electric current shunt comprising a member of resistance material having two terminals designed for connection to a derived circuit, and an adjustable terminal operatively related to said member whereby the potential drop between two said first mentioned terminals may be varied by adjusting the adjustable terminal.

3. An electric current shunt comprising three terminals connected by resistance material, two of said terminals being designed for connection to a derived circuit and the third terminal for connection to a supply circuit, the resistance between said two terminals being constant, and means whereby the third terminal may be adjusted to vary the resistance between the third terminal and the other two terminals.

4. An electric current shunt comprising a member of resistance material having two terminals for supplying current to a derived circuit, a third terminal operatively related to said member and adapted for connection to a supply circuit, and means whereby said third terminal may be adjusted to vary the relative potential drop between said two first mentioned terminals.

5. A current shunt for an electrical measuring instrument comprising an integral member of resistance material, two terminals on said member arranged for connection to the terminals of the instrument, and a third terminal on said member arranged to form a triangle with said other two terminals.

6. A current shunt for an electrical measuring instrument comprising an integral member of resistance material, two terminals on said member arranged for connection to the terminals of the instrument, and a third terminal on said member arranged for connection to a supply circuit and so positioned that the supply current will flow from said third terminal through said member in two directions and toward each of said two first mentioned terminals.

7. A current shunt for electrical apparatus comprising two relatively fixed terminals for connection to the terminals of the apparatus, a third terminal for connection to a supply circuit, resistance material electrically connecting said terminals, and means whereby said third terminal may be adjusted to vary the relative drop in potential between said fixed terminals.

8. An electric current shunt comprising a substantially triangular shaped member of resistance material, fixed terminals near two of the corners of said member, an auxiliary member of resistance material connecting the third corner and one of the other corners of said triangular shaped member and an adjustable terminal connected to said auxiliary member.

9. An electric current shunt comprising a member of resistance material having two terminals, an auxiliary member of resistance material electrically connected to said first mentioned member, and a pivoted arm electrically connected to said auxiliary member and adapted to be turned about its pivot for adjusting its position on said auxiliary member.

10. An electric current shunt comprising a member of resistance material having two terminals, an auxiliary member of resistance material integrally connected to said first mentioned member and having a guide slot therein, a contact element operatively positioned in said slot, a pivoted arm connected to said element and arranged to move said element in said slot, a terminal on said arm, and means for securing said element at any desired position in said slot.

11. An electric current shunt comprising a member of resistance material having two terminals each arranged for connection to a derived circuit and to a supply circuit, a third terminal electrically related to said member, means whereby the connection of one of said terminals to the supply circuit may be severed and a second supply circuit connected to the third terminal, and means whereby the position of said third terminal may be adjusted to vary the relative potential drop between said two first mentioned terminals when said third terminal is connected to the second supply circuit.

12. An electric current shunt comprising a member of resistance material having two terminals each arranged for connection to a derived circuit and to a supply circuit, an auxiliary member of resistance material electrically connected to said first mentioned member, a third terminal coöperating with said auxiliary member, means whereby the connection of one of said first mentioned terminals to the supply circuit may be severed and a second supply circuit connected to the third terminal, and means whereby the position of said third terminal may be adjusted for varying the relative potential drop between said two first mentioned terminals when said third terminal is connected to the second supply circuit.

In witness whereof, I have hereunto set my hand this Twenty-Fourth day of January, 1913.

WILLIAM H. PRATT.

Witnesses:
JOHN A. McMANUS, Jr.,
JAMES E. MINKLER.